(12) United States Patent
Szylakowski et al.

(10) Patent No.: US 8,729,392 B2
(45) Date of Patent: May 20, 2014

(54) THERMOPLASTIC POLYURETHANE MATERIAL WITH ENHANCED FLUID IMMERSION AND WATER ABSORPTION CAPABILITIES

(75) Inventors: Gregg R. Szylakowski, Loveland, OH (US); Michael J. Burke, Marshfield, MA (US)

(73) Assignee: General Cable Technologies Corporation, Highland Heights, KY (US)

(*) Notice: Subject to any disclaimer, the term of this patent is extended or adjusted under 35 U.S.C. 154(b) by 255 days.

(21) Appl. No.: 12/837,940

(22) Filed: Jul. 16, 2010

(65) Prior Publication Data

US 2011/0011615 A1 Jan. 20, 2011

Related U.S. Application Data

(60) Provisional application No. 61/226,076, filed on Jul. 16, 2009.

(51) Int. Cl.
*H01B 7/00* (2006.01)
(52) U.S. Cl.
USPC ........... 174/110 R; 174/110 SR; 174/110 AR
(58) Field of Classification Search
USPC ................ 174/102 R, 102 SC, 103, 110 R, 174/110 N–110 PM, 120 R, 120 SC, 121 A; 525/71, 74, 77, 78, 80, 194, 285, 232, 525/240; 428/372, 375, 379, 383
See application file for complete search history.

(56) References Cited

U.S. PATENT DOCUMENTS

| | | | |
|---|---|---|---|
| 3,403,036 A * | 9/1968 | Hindersinn et al. | 524/409 |
| 3,970,716 A * | 7/1976 | Evers et al. | 524/84 |
| 4,275,180 A * | 6/1981 | Clarke | 525/173 |
| 4,397,974 A * | 8/1983 | Goyert et al. | 524/143 |
| 5,430,091 A * | 7/1995 | Mahabir | 524/371 |
| 5,567,763 A * | 10/1996 | Madan et al. | 524/701 |
| 6,017,987 A * | 1/2000 | Okisaki et al. | 524/408 |
| 6,316,532 B1 * | 11/2001 | Nozaki et al. | 524/100 |
| 6,339,189 B1 | 1/2002 | Caimi | |
| 6,559,078 B2 * | 5/2003 | Nozaki et al. | 442/43 |
| 6,995,204 B2 * | 2/2006 | Endou et al. | 524/417 |
| 2003/0220422 A1 * | 11/2003 | Kaprinidis | 524/86 |
| 2009/0194315 A1 | 8/2009 | Van Der Meer | |
| 2009/0239987 A1 | 9/2009 | Siddhamalli | |
| 2010/0025071 A1 | 2/2010 | Jeroense et al. | |
| 2011/0011615 A1 * | 1/2011 | Szylakowski et al. | 174/110 SR |

FOREIGN PATENT DOCUMENTS

WO   WO 2006/121549 A   * 11/2006 ............... C08K 5/00

* cited by examiner

*Primary Examiner* — William H Mayo, III
(74) *Attorney, Agent, or Firm* — Blank Rome LLP

(57) ABSTRACT

Compositions for use as cable coverings, e.g. insulation or jacket, are described. The compositions contain a base polymer having (a) a thermoplastic polyurethane (TPU); (b) a chlorinated flame retardant; and (c) an antimony flame retardant.

20 Claims, No Drawings

THERMOPLASTIC POLYURETHANE MATERIAL WITH ENHANCED FLUID IMMERSION AND WATER ABSORPTION CAPABILITIES

This application claims the priority of U.S. Provisional Patent Application Ser. No. 61/226,076, filed Jul. 16, 2009, which is incorporated herein by reference.

FIELD OF THE INVENTION

The present invention relates to compositions for use as cable coverings, e.g. insulation or jacket, that meets industry requirements (especially Mil-PRF-85045F (1999), which is incorporated herein by reference) for low water absorption, and high tensile strength and elongation retention properties upon fluid immersion.

BACKGROUND OF THE INVENTION

Several different types of data cables are in use today. Some data cables utilize optical fibers to transmit light signals, while others use conductors to convey electrical data signals. Depending on the location, to effectively convey data signals from one location to another, a conductive data cable must minimize or prevent moisture inside the data cable since high moisture levels can degrade conductivity and result in loss of data or data distortion. Depending on the construction of the particular data cable, the introduction of moisture can result in a short circuit, an increase in the data cable's capacitance, an increase in signal attenuation, or in the complete failure of the data cable.

Moisture can penetrate to the interior of the data cable in several different ways. Water may enter through a failure in a data cable's jacket. Water may also enter through a cable end, where a cable connector is attached. Mechanical impacts, electrical arcs, or lightning may breach the jacket that protects the data cable or the joint where one data cable joins another. Water may then flow through the breach towards the core of the data cable and longitudinally along the length of the data cable. Also, changes in ambient conditions may lead to differences in water vapor pressure between the interior and the exterior of the data cable. The difference in vapor pressure may then cause moisture to diffuse into the interior of the data cable. Eventually, there may be an undesirable level of moisture inside the cable or the insulation.

Various methods have been used to block water. One method of protecting data cables against water penetration is to provide a layer of plastic or polymeric material. In a cable insulated by a polymeric material, the polymeric material, when submerged in water can absorb water, causing problems in dielectric properties and wetting of the conductor (light or electrical).

Another method of protecting a data cable against water penetration is to use water swellable materials. However, when water swellable materials are exposed to high humidity over a long period of time, they expand by as much as three times their original volume. Associated dielectric properties of water swellable materials, such as dissipation factor and dielectric constant, change as water swellable materials absorb moisture. The water swellable materials are generally in close proximity to the insulated conductors of the data cable. Thus, changes in the dielectric properties of the water swellable materials affect the dielectric properties of conductive data cables, and changes in the dielectric properties of conductive data cables affect their data transmission capabilities. Therefore, when the dielectric properties of the water swellable material change, the change affects the data transmission capabilities of conductive data cables.

Thus, there is a need for a cable covering composition that provides low water absorption, while at the same time retaining high tensile strength and elongation retention properties upon fluid immersion protection.

SUMMARY OF THE INVENTION

The present invention provides an insulation or jacket composition for a cable containing a base polymer having (a) a thermoplastic polyurethane (TPU); (b) a chlorinated flame retardant; and (c) an antimony flame retardant. The chlorinated flame retardant can be 1,2,3,4,7,8,9,10,13,13,14,14-dodecachloro-1,4,4a,5,6,6a,7,10,10a,11,12,12a-dodecahydro-1,4,7,10-dimethanodibenzo (a,e) cyclooctene having the chemical structure of Formula I

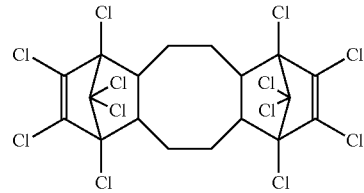

Formula I which is commercially available as Dechlorane Plus® from Ocidental Chemical Corporation. The chlorinated flame retardant preferably has a mean particle size of about 1-15 microns, most preferably about 4-5 microns.

The antimony flame retardant can be antimony pentoxide or antimony trioxide, preferably antimony trioxide. The antimony flame retardant is commercially available as Antimony TMS® from Chemtura Corporation.

In an embodiment, the TPU is a polyether. The insulation composition contains about 68-81% (w/w of the total composition) of the TPU, about 15-25% (w/w of the total composition) of the chlorinated flame retardant, and about 1-4% (w/w of the total composition) of the antimony flame retardant. The composition meets the industry requirements for moisture uptake and fluid immersion.

Cables containing a conductor covered by the composition of the present invention are also provided. The conductor can be a light conductor or an electrical conductor. The cable can be a data cable or other cables.

Methods for making the composition and the cable are also provided.

DETAILED DESCRIPTION OF THE PREFERRED EMBODIMENT

The present invention provides an insulation or jacket composition for electric cables comprising a base polymer comprising (a) a thermoplastic polyurethane (TPU); (b) a chlorinated flame retardant; and (c) an antimony flame retardant. The chlorinated flame retardant can be 1,2,3,4,7,8,9,10,13,13,14,14-dodecachloro-1,4,4a,5,6,6a,7,10,10a,11,12,12a-dodecahydro-1,4,7,10-dimethanodibenzo (a,e) cyclooctene having the chemical structure of Formula I

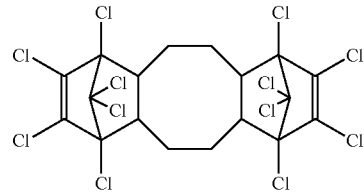

Formula I which is commercially available as Dechlorane Plus® from Ocidental Chemical Corporation. The chlorinated flame retardant preferably has a mean particle size of about 1-15 microns, most preferably about 4-5 microns.

The antimony flame retardant can be antimony pentoxide or antimony trioxide, preferably antimony trioxide. The antimony flame retardant is commercially available as Antimony TMS® from Chemtura Corporation.

In an embodiment, the TPU is a polyether. The TPU has a preferred saponification index of about 100-200 mg KOH/g, more preferably about 100-150 mg KOH/g, and most preferably about 110 mg KOH/g. The preferred physical properties for the TPU are as follows:

Specific gravity—1.05-1.11 (ASTM D-792)
Shore Hardness—85 A (ASTM D-2240)
Tensile Strength—5800 5000-7000 psi (ASTM D-412)
Elongation @ Break—620 500-700% (ASTM D-412)
Modulus @ 100% Elongation—800-1000 psi (ASTM D-412)
Modulus @ 300% Elongation—1300-1600 psi (ASTM D-412)
Tear Strength—515 500-600 lb/in (ASTM D-624 (Die C))
Abrasion Loss—20 mm$^3$ (DIN 53.516)
Moisture Content—<0.05% (MQSA 44)
Melting Range—375-390° F. (MQSA 70 (Kofler))

More preferably, the TPU can also include the following properties:

Compression Set (70 h. @ 73° F.)—25% (ASTM D-395)
Compression Set (24 h. @ 158° F.)—45% (ASTM D-395)

The TPU is preferably a linear segmented block copolymer composed of hard and soft segments. The hard segment is preferably an aromatic based on isocyanates. When isocyanates are combined with short-chain diols, they become the hard block. The soft segment is preferably a polyether. A TPU that is appropriate for the present invention is commercially available as PERLTHANE® D16N85. The composition preferably contains about 68-81% (w/w of the total composition) TPU, about 15-25% (w/w of the total composition) chlorinated flame retardant, and about 1-4% (w/w of the total composition) antimony flame retardant. More preferably, the composition contains about 68-72% (w/w of the total composition) TPU, about 20-22% (w/w of the total composition) chlorinated flame retardant, and about 1.5-2.5% (w/w of the total composition) antimony flame retardant. The composition meets the industry requirements for moisture uptake and fluid immersion.

The composition can contain other components such as fillers, ultraviolet (UV) light absorbers, hindered amine light stabilizers (HALS), phenolic antioxidants, etc. The fillers may be present at about 0.5-2% (w/w). Examples of suitable fillers include, but are not limited to, carbon black, clay, talc (aluminum silicate or magnesium silicate), magnesium aluminum silicate, magnesium calcium silicate, calcium carbonate, magnesium calcium carbonate, silica, ATH, magnesium hydroxide, sodium borate, calcium borate, kaolin clay, glass fibers, glass particles, or mixtures thereof. In accordance with the invention, the weight percent range for fillers is from about 0.5-2%.

As described above, the insulation composition of the present invention may contain at least one HALS. The HALS may be present at about 0.1-0.4% (w/w). Any suitable HALS may be used in accordance with the invention, for example, Bis (2,2,6,6-tetramethyl-4-piperidyl) sebaceate (Tinuvin 770); Bis(1,2,2,6,6-tetramethyl-4-piperidyl) sebaceate+methyl 1,2,2,6,6-tetramethyl-4-piperidyl sebaceate (Tinuvin 765); 1,6-Hexanediamine, N,N'-Bis(2,2,6,6-tetramethyl-4-piperidyl) polymer with 2,4,6 trichloro-1,3,5-triazine, reaction products with N-butyl 2,2,6,6-tetramethyl-4-piperidinamine (Chimassorb 2020); Decanedioic acid, Bis(2,2,6,6-tetramethyl-1-(octyloxy)-4-piperidyl)ester, reaction products with 1,1-dimethylethylhydroperoxide and octane (Tinuvin 123); Triazine derivatives (Tinuvin NOR 371); butanedioic acid, dimethylester 4 hydroxy-2,2,6,6-tetramethylpiperidine ethanol (Tinuvin 622); 1,3,5-Triazine-2,4,6-triamine,N,N'''-[1,2-ethane-diyl-bis[[[4,6-bis-[butyl(1,2,2,6,6pentamethyl-4-piperdinyl)amino]-1,3,5-triazine-2-yl] imino]3,1-propanediyl]] bis[N',N''-dibutyl-N',N'' bis(2,2,6,6-tetramethyl-4-piperidyl) (Chimassorb 119). Tinuvin 770 is the preferred hindered amine light stabilizers.

As stated above, any suitable phenolic antioxidant may be used in accordance with the invention, for example, thiodiethylene bis[3-(3,5-di-tert-butyl-4-hydroxyphenyl)propionate], 4,4'-thiobis(2-tert-butyl-5-methylphenol), 2,2'-thiobis(4-methyl-6-tert-butyl-phenol), benzenepropanoic acid, 3,5 bis(1,1 dimethylethyl)4-hydroxy benzenepropanoic acid, 3,5-bis(1,1-dimethylethyl)-4-hydroxy-C13-15 branched and linear alkyl esters, 3,5-di-tert-butyl-4 hydroxyhydrocinnamic acid C7-9-branched alkyl ester, 2,4-dimethyl-6-t-butylphenol Tetrakis {methylene 3-(3',5'-ditert-butyl-4'-hydroxyphenol)propionate}methane or tetrakis {methylene 3-(3',5'-di-tert-butyl-4'-hydrocinnamate}methane (Anox 20), 1,1,3 tris (2-methyl-4 hydroxyl 5 butylphenyl)butane, 2,5, di t-amyl hydroqunone, 1,3,5-tri methyl 2,4,6 tris(3,5 di tert butyl 4 hydroxybenzyl) benzene, 1,3,5 tris(3,5 di tert butyl 4 hydroxybenzyl) isocyanurate, 2,2 Methylene-bis-(4-methyl-6-tert butyl-phenol), 6,6'-di-tert-butyl-2,2'-thiodi-p-cresol or 2,2'-thiobis(4-methyl-6-tert-butylphenol), 2,2 ethylenebis (4,6-di-t-butylphenol), Triethyleneglycol bis{3-(3-t-butyl-4-hydroxy-5 methylphenyl) propionate}, 1,3,5 tris(4 tert butyl 3 hydroxy-2,6-dimethylbenzyl)-1,3,5-triazine-2,4,6-(1H, 3H,5H)trione, 2,2 methylenebis{6-(1-methylcyclohexyl)-p-cresol}. Additionally, phenolic antioxidants disclosed in U.S. Pat. Nos. 4,020,042 and 6,869,995, which are incorporated herein by reference, are also appropriate for the present invention. Additionally, thio ester antioxidant co-stabilisers provide long term protection of the polymer. Anox 20 (tetrakismethylene (3',5'-ditert-butyl-4-hydroxyhydrocinnamate) methane) is the preferred phenolic antioxidant. The phenolic antioxidant may be present at about 0.1-0.5% (w/w).

The insulation of the present invention may contain at least one UV absorber, such as 2-hydroxy-4-methoxy benzophenone; 2-hydroxy-4-octoxy benzophenone; 2-(2'-hydroxy-5'-methylphenyl)-benzotriazole; 2-(2'-hydroxy -3'-tert-butyl-5'-methylphenyl)-5-chloro benzotriazole; 2-(2'-hydroxy-3', 5'-ditert-butylphenyl)-5-chloro benzotriazole; 2-(2'-hydroxy-3',5'-ditert-butylphenyl)- benzotriazole; 2-(2H-benzotriazol-2-yl)-4,6-ditertpentylphenol (Tinuvin 328); 2-(5-chloro-2H-benzotriazole-2-yl)-6-(1,1-dimethylethyl)-4-methylphenol (Tinuvin 326); 2,4-di-tert-butyl-6-(5-chlorobenzotriazol-2-yl) phenol (Tinuvin 327), and 2-benzotriazol-2-yl-4-methyl-phenol (Tinuvin P). The preferred UV absorber is Tinuvin 328. The UV absorber may be present in the present insulation composition at about 0.2-0.6% (w/w).

All of the components of the compositions utilized in the invention are usually blended or compounded together prior to their introduction into an extrusion device from which they are to be extruded onto an electrical conductor. The polymer and the other additives and fillers may be blended together by any of the techniques used in the art to blend and compound such mixtures to homogeneous masses. For instance, the components may be fluxed on a variety of apparatus including multi-roll mills, screw mills, continuous mixers, compounding extruders and Banbury mixers.

After the various components of the composition are uniformly admixed and blended together, they are further processed to fabricate the cables of the invention. Prior art methods for fabricating polymer insulated cable and wire are well known, and fabrication of the cable of the invention may generally be accomplished using any of the various extrusion methods.

In a typical extrusion method, an optionally heated conducting core to be coated is pulled through a heated extrusion die, generally a cross-head die, in which a layer of melted polymer is applied to the conducting core. Upon exiting the die, the conducting core with the applied polymer layer is passed through a cooling section, generally an elongated cooling bath, to cool. Multiple polymer layers may be applied by consecutive extrusion steps in which an additional layer is added in each step, or with the proper type of die, multiple polymer layers may be applied simultaneously.

The conductor of the invention may generally comprise any suitable electrically or optically conducting material. For electrical conductors, preferably, the metals utilized are copper or aluminum. In another embodiment, the conductor can be an optical conductor, such as an optical fiber.

The covering (insulation or jacket) composition of the present invention provides the electrical cable with water absorption and fluid immersion properties that meet or exceed industry requirements. With regard to water absorption, the maximum water absorption of the finished cable or a sample of the external cable jacket material shall not be greater than 4.0 mg per square centimeter ($mg/cm^2$) of exposed cable surface area, preferably not greater than 2.5 $mg/cm^2$. Water absorption is preferably determined using the gravimetric method of ASTM-D-470 (2005), which is incorporated herein by reference, with a water temperature of 71±1° C. for a continuous three day period. The exposed surface area of the finished cable or cable jacket specimen is not less than 5 $cm^2$ and not greater than 10 $cm^2$.

With regard to fluid immersion properties, the tensile strength and elongation retention properties of the cable jacket material are not less than 50% of the initial values, preferably not less than 80%, and more preferably not less than 90%. After testing, the finished cable reveals no cracks, splits, gumminess, or voids in the cable jacket. Also, the outer diameter of the finished cable does not deviate greater than 50 percent after testing in accordance with EIA/TIA-455-12-B (2008), which is incorporated herein by reference. For cable jacket materials, specimens of flat extruded cable outer jacket material are immersed. After a 24 hour immersion, the specimen is removed, blotted to remove excess fluid, and suspended in the air at room temperature for not less than 3.5 hours and not more than 4.5 hours. The tensile strength and elongation of each specimen are preferably determined in accordance with FED-STD-228 (2000), methods 3021 and 3031, which are incorporated herein by reference, with 2.5 cm bend marks, 2.5 cm jaw separation, and a rate of travel of 25 cm/minute. The thickness of the specimen is measured using a micrometer. For finished cable, a two meter specimen may be cut into five pieces, and each piece immersed such that its two ends are exposed to the atmosphere. After each 24 hour immersion, the specimen shall be removed, blotted to remove excess fluid, and suspended in air at room temperature for not less than 3.5 hours and not more than 4.5 hours. The diameter change of the cable is then determined by measuring the cable circumference and dividing the resultant value by 3.14.

Without further description, it is believed that one of ordinary skill in the art can, using the preceding description and the following illustrative examples, make and utilize the compounds of the present invention and practice the claimed methods. The following examples are given to illustrate the present invention. It should be understood that the invention is not to be limited to the specific conditions or details described in these examples.

EXAMPLE 1

Cable insulation material were made in accordance with the ingredients of Table 1:

TABLE 1

|  | DA | DB | DC | DD |
| --- | --- | --- | --- | --- |
| Pearlthane 16N85 | 2693.8 | 2509.0 | 2561.4 | 2750.2 |
| Dechlorane Plus 25 | 808.1 | 1003.6 | 1024.6 | 825.1 |
| Antimony TMS | 80.8 | 75.3 |  | 82.5 |
| Anox 20 | 14.8 | 13.9 | 14.2 | 15.1 |
| Tinuvin 328 | 18.6 | 17.4 | 07.7 | 19.0 |
| Tinuvin 770 | 9.4 | 8.7 | 8.9 | 9.6 |
| Carbon Black (N660 or N550) | 26.9 | 25.1 | 25.6 | 27.5 |
| Dynamix 2425L | 153.5 | 153.1 | 153.7 | 77.0 |
| Total | 3806.0 | 3806.0 | 3806.0 | 3806.0 |

The amount of each component given in Table 1 is in grams. The components used are as follows: TPU—Pearlthane and Dynamix; chlorinated flame retardant—Dechlorane Plus; antimony flame retardant—Antinony TMS; phenolic antioxidant—Anox 20; UV light absorber—Tinuvin—328; HALS—Tinuvin 770; and filler—carbon black.

EXAMPLE 2

The insulation material labeled DA was tested for water absorption. Three samples having the dimensions of Table 2 were tested.

TABLE 2

| Sample | Length | Width | Thickness | Area |
| --- | --- | --- | --- | --- |
| 1 | 3.175 cm | 1.27 cm | 0.1036 cm | 8.987 $cm^2$ |
| 2 | 3.175 cm | 1.27 cm | 0.1069 cm | 9.013 $cm^2$ |
| 3 | 3.175 cm | 1.27 cm | 0.1054 cm | 8.999 $cm^2$ |

The water absorption results are shown in Table 3.

TABLE 3

| Sample | $1^{st}$ Dry weight (A) | $2^{nd}$ Wet weight (B) | $3^{rd}$ Dry weight (C) | Moisture Absorption |
| --- | --- | --- | --- | --- |
| 1 | 523.4 mg | 542.2 mg | 521.4 mg | 2.31 $mg/cm^2$ |
| 2 | 538.8 mg | 557.8 mg | 537.3 mg | 2.27 $mg/cm^2$ |
| 3 | 539.2 mg | 557.9 mg | 537.9 mg | 2.28 $mg/cm^2$ |
|  | Average: |  |  | 2.29 $mg/cm^2$ |

EXAMPLE 3

Fluid immersion tests were conducted on insulation material labeled DA. Tests were conducted for the following fluids: fuel oil, turbine fuel, isopropyl alcohol, hydraulic fluid, lubricating oil, Monsanto coolant 25 R, and 3% NaCl solution.

The following tables show fluid immersion test results for crosshead speed of 10 inches per minute (IPM) and dumbbell width of 0.250 inches (DA insulation material). The immersion time is 24 hours for all tests.

TABLE 4

Fuel Oil - Mil-F-1684 - Temperature 33-37° C. (actual temp. 35° C.)

| Sample | Thickness | Pounds | Tensile Strength PSI | Elongation % |
|---|---|---|---|---|
| 1 | .0413 in. | 44.01 | 4262 | 470 |
| 2 | .0427 in. | 37.33 | 3997 | 448 |
| 3 | .0470 in. | 39.75 | 3383 | 483 |
| Median: | | | 3881 PSI | 467% |
| % Retention: | | | 88% | 103% |

TABLE 5

Turbine fuel - JP5 - MIL-T-5624 - Temperature 20-25° C. (actual temp. 23° C.)

| Sample | Thickness | Pounds | Tensile Strength PSI | Elongation % |
|---|---|---|---|---|
| 1 | .0426 in. | 44.15 | 4146 | 454 |
| 2 | .0463 in. | 44.75 | 3866 | 433 |
| 3 | .0465 in. | 45.55 | 3918 | 442 |
| Median: | | | 3977 PSI | 443% |
| % Retention: | | | 90% | 98% |

TABLE 6

Turbine fuel - JP5 - MIL-T-5624 - Temperature 20-25° C. (actual temp. 23° C.)

| Sample | Thickness | Pounds | Tensile Strength PSI | Elongation % |
|---|---|---|---|---|
| 1 | .0432 in. | 39.48 | 3656 | 441 |
| 2 | .0420 in. | 38.43 | 3660 | 430 |
| 3 | .0437 in. | 39.10 | 3579 | 433 |
| Median: | | | 3632 PSI | 435% |
| % Retention: | | | 82% | 96% |

TABLE 7

Isopropyl alcohol - TT-I0735 - Temperature 20-25° C. (actual temp. 25° C.)

| Sample | Thickness | Pounds | Tensile Strength PSI | Elongation % |
|---|---|---|---|---|
| 1 | .0430 in. | 26.36 | 2452 | 435 |
| 2 | .0439 in. | 27.02 | 2462 | 438 |
| 3 | .0445 in. | 27.58 | 2479 | 483 |
| Median: | | | 2464 PSI | 452% |
| % Retention: | | | 56% | 100% |

TABLE 8

Hydraulic fluid - Mil-H-5606 - Temperature 48-50° C. (actual temp. 49° C.)

| Sample | Thickness | Pounds | Tensile Strength PSI | Elongation % |
|---|---|---|---|---|
| 1 | .0420 in. | 42.66 | 4063 | 447 |
| 2 | .0435 in. | 39.23 | 3607 | 388 |
| 3 | .0465 in. | 46.19 | 3973 | 436 |
| Median: | | | 3881 PSI | 424% |
| % Retention: | | | 88% | 94% |

TABLE 9

Hydraulic fluid - Mil-H-17672 - Temperature 48-50° C. (actual temp. 49° C.)

| Sample | Thickness | Pounds | Tensile Strength PSI | Elongation % |
|---|---|---|---|---|
| 1 | .0446 in. | 44.55 | 3996 | 429 |
| 2 | .0498 in. | 40.50 | 3253 | 419 |
| 3 | .0450 in. | 43.65 | 3880 | 436 |
| Median: | | | 3710 PSI | 428% |
| % Retention: | | | 84% | 95% |

TABLE 10

Lubricating oil - Mil-L-17331 - Temperature 73-77° C. (actual temp. 75° C.)

| Sample | Thickness | Pounds | Tensile Strength PSI | Elongation % |
|---|---|---|---|---|
| 1 | .0423 in. | 36.10 | 3413 | 425 |
| 2 | .0446 in. | 35.89 | 3219 | 430 |
| 3 | .0445 in. | 36.19 | 3253 | 423 |
| | | | 3295 PSI | 426% |
| % Retention: | | | 75% | 94% |

TABLE 11

Lubricating oil - Mil-L-23699 - Temperature 73-77° C. (actual temp. 75° C.)

| Sample | Thickness | Pounds | Tensile Strength PSI | Elongation % |
|---|---|---|---|---|
| 1 | .0432 in. | 37.68 | 3489 | 400 |
| 2 | .0440 in. | 38.37 | 3488 | 418 |
| 3 | .0468 in. | 37.85 | 3235 | 409 |
| Median: | | | 3404 PSI | 409% |
| % Retention: | | | 77% | 90% |

TABLE 12

Lubricating oil - Mil-L-24467 - Temperature 73-77° C. (actual temp. 75° C.)

| Sample | Thickness | Pounds | Tensile Strength PSI | Elongation % |
|---|---|---|---|---|
| 1 | .0426 in. | 39.10 | 3671 | 438 |
| 2 | .0450 in. | 40.25 | 3578 | 440 |
| 3 | .0470 in. | 40.09 | 3412 | 456 |
| Median: | | | 3553 PSI | 445% |
| % Retention: | | | 80% | 98% |

TABLE 13

Monsanto coolant 25R - MIL-C-47220 - Temperature 20-25° C. (actual temp. 25° C.)

| Sample | Thickness | Pounds | Tensile Strength PSI | Elongation % |
|---|---|---|---|---|
| 1 | .0428 in. | 38.82 | 3628 | 419 |
| 2 | .0425 in. | 37.10 | 3492 | 426 |
| 3 | .0445 in. | 37.05 | 3330 | 400 |
| Median: | | | 3483 PSI | 415% |
| % Retention: | | | 79% | 92% |

TABLE 14

3% NaCl -Temperature 20-25° C. (actual temp. 25° C.)

| Sample | Thickness | Pounds | Tensile Strength PSI | Elongation % |
|---|---|---|---|---|
| 1 | .0415 in. | 43.94 | 4235 | 454 |
| 2 | .0428 in. | 43.38 | 4054 | 446 |
| 3 | .0430 in. | 44.91 | 4178 | 449 |
|   | Median: |   | 4156 PSI | 450% |
|   | % Retention: |   | 94% | 99% |

EXAMPLE 4

Tensile strength test for DA, DB, DC, and DD formulations were tested in accordance with ASTM D412 (2003) which is incorporated herein by reference. The test results are summarized in Tables 15-18 below.

TABLE 15

| TPU (DA) formulation | Tensile Strength (PSI) | Elonagtion % | Modulus 100% | Modulus 200% | Modulus 300% |
|---|---|---|---|---|---|
| Sample 1 | 4298 | 450 | 942 | 1407 | 2298 |
| Sample 2 | 4270 | 437 | 938 | 1423 | 2349 |
| Sample 3 | 4505 | 467 | 972 | 1428 | 2275 |
| Sample 4 | 4554 | 456 | 965 | 1455 | 2365 |
| Sample 5 | 4460 | 453 | 956 | 1433 | 2352 |
| Mean | 4417.4 | 452.77% | 955 | 1429 | 2365 |

TABLE 16

| TPU (DB) formulation | Tensile Strength (PSI) | Elonagtion % | Modulus 100% | Modulus 200% | Modulus 300% |
|---|---|---|---|---|---|
| Sample 1 | 3887 | 441.91 | 982 | 1404 | 2193 |
| Sample 2 | 4000 | 449.25 | 923 | 1363 | 2208 |
| Sample 3 | 3769 | 452.37 | 919 | 1319 | 2056 |
| Sample 4 | 3608 | 454.05 | 852 | 1228 | 1937 |
| Sample 5 | 3569 | 467.37 | 838 | 1193 | 1870 |
| Mean | 3767 | 452.99% | 903 | 1301 PSI | 2053 |

TABLE 17

| TPU (DC) formulation | Tensile Strength (PSI) | Elonagtion % | Modulus 100% | Modulus 200% | Modulus 300% |
|---|---|---|---|---|---|
| Sample 1 | 4198 | 508.87 | 792 | 1133 | 1739 |
| Sample 2 | 3777 | 507.54 | 773 | 1105 | 1703 |
| Sample 3 | 3927 | 501.85 | 732 | 1068 | 1701 |
| Sample 4 | 3887 | 506.2 | 805 | 1131 | 1746 |
| Sample 5 | 3855 | 516.55 | 780 | 1090 | 1661 |
| Mean | 3929 | 508.20% | 776 | 1105 | 1710 |

TABLE 18

| TPU (DD) formulation | Tensile Strength (PSI) | Elonagtion % | Modulus 100% | Modulus 200% | Modulus 300% |
|---|---|---|---|---|---|
| Sample 1 | 3744 | 556.27 | 842 | 1156 | 1631 |
| Sample 2 | 3288 | 518.26 | 842 | 1160 | 1646 |
| Sample 3 | 3424 | 513.36 | 849 | 1185 | 1659 |
| Sample 4 | 3523 | 433.16 | 710 | 1193 | 1949 |
| Sample 5 | 2977 | 444.96 | 692 | 1086 | 1725 |
| Mean | 3391 | 493.20% | 787 | 1156 | 1722 |

EXAMPLE 5

DA, DB, DC, and DD were tested, in accordance with ASTM D2863 (2006) which is incorporated herein by reference, for their flame retardant property, including their limited oxygen index (LOI). The following Table 19 shows the LOI for insulations made using DA, DB, DC, and DD formulations.

TABLE 19

| Time for Flame to Extinguish | LOI | Volumetric Flow of Oxygen (cm$^3$/sec) | Volumetric Flow of Nitrogen (cm$^3$/sec) |
|---|---|---|---|
| DA | | | |
| 0:59 sec. | 25 | 3420 | 10260 |
| exceeded 3 minute burn | 26 | 3557 | 10123 |
| 0:48 sec. | 25 | 3420 | 10260 |
| exceeded 3 minute burn | 26 | 3557 | 10123 |
| 0:55 sec. | 25 | 3420 | 10260 |
| Exceeded 3 minute burn | 26 | 3557 | 10123 |
| | | | LOI Results (26) |
| DB | | | |
| 1:02 sec. | 25 | 3420 | 10260 |
| Exceeded 3 minutes | 26 | 3556 | 10123 |
| Exceed 3 minutes | 26 | 3556 | 10123 |
| 1:56 sec. | 25 | 3420 | 10260 |
| Exceeded 3 minutes | 26 | 3556 | 10123 |
| | | | LOI Results (26) |
| DC | | | |
| 1:08 sec. | 20 | 2736 | 10944 |
| exceeded 3 minutes | 23 | 3146 | 10534 |
| Exceeded 3 minutes | 21 | 2873 | 10807 |
| 1:18 sec. | 20 | 2736 | 10944 |
| exceeded 3 minutes | 21 | 2873 | 10807 |
| | | | LOI Results (21) |

TABLE 19-continued

| Time for Flame to Extinguish | LOI | Volumetric Flow of Oxygen (cm³/sec) | Volumetric Flow of Nitrogen (cm³/sec) |
|---|---|---|---|
| DD | | | |
| 0:29 sec. | 24 | 3283 | 10397 |
| 0:32 sec. | 25 | 3420 | 10260 |
| 0:26 sec. | 26 | 3557 | 10123 |
| exceeded 3 minutes | 27 | 2694 | 9986 |
| 0:42 sec. | 26 | 3557 | 10123 |
| Exceeded 3 minutes | 27 | 2694 | 9986 |
| | | | LOI Results (27) |

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A composition consisting of a thermoplastic polyurethane (TPU), a chlorinated flame retardant, an antimony flame retardant, a phenolic antioxidant, a UV light stabilizer, a hindered amine light stabilizer (HALS), and a filler, wherein the chlorinated flame retardant is 1,2,3,4,7,8,9,10,13,13,14,14-dodecachloro-1,4,4a,5,6,6a,7,10,10a,11,12,12a-dodecahydro-1,4,7,10-dimethanodibenzo (a,e) cyclooctene.

2. The composition of claim 1, wherein the TPU is polyether.

3. The composition of claim 1, wherein the antimony flame retardant is antimony trioxide.

4. The composition of claim 1, wherein the TPU is present at about 68-81% (w/w).

5. The composition of claim 1, wherein the chlorinated flame retardant is present at about 15-25% (w/w).

6. The composition of claim 1, wherein the antimony flame retardant is present at about 1-4% (w/w).

7. The composition of claim 1, wherein the phenolic antioxidant is present at about 0.1-0.5% (w/w).

8. The composition of claim 1, wherein the UV light stabilizer is present at about 0.2-0.6% (w/w).

9. The composition of claim 1, wherein the HALS is present at about 0.1-0.4% (w/w).

10. The composition of claim 1, wherein the filler is present at about 0.5-2.0% (w/w).

11. A cable comprising a conductor; and an insulation or a jacket covering the conductor, said jacket consists of a thermoplastic polyurethane (TPU), a chlorinated flame retardant, and an antimony flame retardant, a phenolic antioxidant, a UV light stabilizer, a hindered amine light stabilizer (HALS), and a filler, wherein the chlorinated flame retardant is 1,2,3,4,7,8,9,10,13,13,14,14-dodecachloro-1,4,4a,5,6,6a,7,10,10a,11,12,12a-dodecahydro-1,4,7,10-dimethanodibenzo (a,e) cyclooctene.

12. The cable of claim 11, wherein the TPU is polyether.

13. The cable of claim 11, wherein the antimony flame retardant is antimony trioxide.

14. The cable of claim 11, wherein the TPU is present at about 68-81% (w/w).

15. The cable of claim 11, wherein the chlorinated flame retardant is present at about 15-25% (w/w).

16. The cable of claim 11, wherein the antimony flame retardant is present at about 1-4% (w/w).

17. The cable of claim 11, wherein the phenolic antioxidant is present at about 0.1-0.5% (w/w).

18. The cable of claim 11, wherein the UV light stabilizer is present at about 0.2-0.6% (w/w).

19. The cable of claim 11, wherein the HALS is present at about 0.1-0.4% (w/w).

20. The cable of claim 11, wherein the filler is present at about 0.5-2.0% (w/w).

* * * * *